United States Patent [19]

Hayes

[11] 3,839,192

[45] Oct. 1, 1974

[54] HYDROCARBON CONVERSION WITH A CATALYTIC COMPOSITE OF PALLADIUM, IRIDIUM AND HALOGEN

[75] Inventor: John C. Hayes, Palatine, Ill.

[73] Assignee: Universal Oil Products Company, Des Plaines, Ill.

[22] Filed: Mar. 20, 1972

[21] Appl. No.: 236,334

Related U.S. Application Data

[62] Division of Ser. No. 40,475, May 22, 1970, abandoned.

[52] U.S. Cl. ................ 208/139, 252/441, 252/442
[51] Int. Cl. ............................................. C10g 35/06
[58] Field of Search ............ 208/139, 138; 252/441, 252/442

[56] References Cited
UNITED STATES PATENTS

| | | | |
|---|---|---|---|
| 2,848,377 | 8/1958 | Webb | 208/139 |
| 2,893,948 | 7/1959 | Hettinger | 208/139 |
| 2,911,357 | 11/1959 | Myers et al. | 208/138 |
| 3,296,119 | 1/1967 | Bicek | 208/139 |
| 3,424,669 | 1/1969 | Carter et al. | 208/65 |
| 3,538,174 | 11/1970 | Brodbeck | 260/668 |
| 3,554,902 | 1/1971 | Buss | 208/139 |

FOREIGN PATENTS OR APPLICATIONS

| | | | |
|---|---|---|---|
| 873,326 | 6/1971 | Canada | 252/466 PT |

*Primary Examiner*—Delbert E. Gantz
*Assistant Examiner*—James W. Hellwege
*Attorney, Agent, or Firm*—James R. Hoatson, Jr.; Thomas K. McBride; William H. Page, II

[57] ABSTRACT

Hydrocarbons are converted by contacting them at hydrocarbon conversion conditions with a platinum-free catalytic composite containing catalytically effective amounts of palladium, iridium and halogen combined with a porous carrier material. A specific example of the type of hydrocarbon conversion process disclosed is a process for the catalytic reforming of a gasoline fraction in the presence of hydrogen, which comprises contacting the gasoline fraction and hydrogen, at reforming conditions, with a platinum-free combination of catalytically effective amounts of a palladium component, an iridium component and a chlorine component with a gamma-alumina carrier material.

7 Claims, No Drawings

HYDROCARBON CONVERSION WITH A CATALYTIC COMPOSITE OF PALLADIUM, IRIDIUM AND HALOGEN

CROSS-REFERENCES TO RELATED APPLICATIONS

This application is a division of my prior, copending application Ser. No. 40,475 which was filed on May 22, 1970, now abandoned.

The subject of the present invention is a novel and platinum-free, bimetallic catalytic composite which has relatively good activity and resistance to deactivation when employed in a hydrocarbon conversion process of the type that requires a catalyst having both a hydrogenation-dehydrogenation function and a cracking function. More precisely, the present invention involves a novel dual-function, bimetallic catalytic composite which, quite surprisingly is free of platinum and performs in a highly efficient manner in hydrocarbon conversion processes that have traditionally used a platinum-containing, dual-function catalyst. In another aspect, the present invention comprehends the improved processes that are produced by the use of a platinum-free catalytic composite comprising a combination of a palladium component, an iridium component, and a halogen component with a porous carrier material; specifically, a reforming process which utilizes the subject catalyst to achieve activity, selectively, and stability characteristics which are comparable to those obtained with a platinum-containing catalyst.

Composites having a hydrogenation-dehydrogenation function and a cracking function are widely used today as catalysts in many industries, such as the petroleum and petrochemical industry, to accelerate a wide spectrum of hydrocarbon conversion reactions. Generally, the cracking function is thought to be associated with an acid-acting material of the porous, adsorptive, refractory oxide type which is typically utilized as the support or carrier for a heavy metal component such as the transition metals or compounds of the transition metals of Groups V through VIII of the Periodic Table to which are generally attributed the hydrogenation-dehydrogenation function.

These catalytic composites are used to accelerate a wide variety of hydrocarbon conversion reactions such as hydrocracking, isomerization, dehydrogenation, hydrogenation, desulfurization, cyclization, alkylation, polymerization, cracking, hydroisomerization, etc. In many cases, the commercial applications of these catalysts are in processes where more than one of these reactions are proceeding simultaneously. An example of this type of process is catalytic reforming wherein a hydrocarbon feed stream containing paraffins and naphthenes is subjected to conditions which promote dehydrogenation of naphthenes to aromatics, dehydrocyclization of paraffins to aromatics, isomerization of paraffins and naphthenes, hydrocracking of naphthenes and paraffins and the like reactions, to produce an octane-rich or aromatic-rich product stream. Another example is a hydrocracking process wherein catalysts of this type are utilized to effect selective hydrogenation and cracking of high molecular weight unsaturated materials, selective hydrocracking of high molecular weight materials, and other like reactions, to produce a generally lower boiling, more valuable output stream. Yet another example is an isomerization process wherein a hydrocarbon fraction which is relatively rich in straight-chain paraffin components is contacted with a dual-function catalyst to produce an output stream rich in isoparaffin compounds.

Regardless of the reaction involved or the particular process involved, it is of critical importance that the dual-function catalyst exhibit not only the capability to initially perform its specified functions, but also that it has the capability to perform them satisfactorily for prolonged periods of time. The analytical terms used in the art to measure how well a particular catalyst performs its intended functions in a particular hydrocarbon reaction environment are activity, selectivity, and stability. And for purposes of discussion here, these terms are conveniently defined for a given charge stock as follows: (1) activity is a measure of the catalyst's ability to convert hydrocarbon reactants into products at a specified severity level where severity level means the conditions used — that is, the temperature, pressure, contact time, and presence of diluents such as $H_2$; (2) selectivity refers to the amount of desired product or products obtained relative to the amount of reactant converted or to the amount of reactant charged; (3) stability refers to the rate of change with time of the activity and selectivity parameters — obviously, the smaller rate implying the more stable catalyst. In a reforming process, for example, activity commonly refers to the amount of conversion that takes place for a given charge stock at a specified severity level and is typically measured by octane number of the $C_5+$ product stream; selectivity refers to the amount of $C_5+$ yield relative to the amount of the charge stock that is obtained at the particular severity level; and stability is typically equated to the rate of change with time of activity, as measured by octane number of $C_5+$ product, and of selectivity as measured by $C_5+$ yield. Actually, the last statement is not strictly correct because generally a continuous reforming process is run to produce a constant octane $C_5+$ product with severity level being continuously adjusted to attain this result; and, furthermore, the severity level is for this process usually varied by adjusting the conversion temperature in the reaction zone so that, in point of fact the rate of change of activity finds response in the rate of change of conversion temperatures and changes in this last parameter are customarily taken as indicative of activity stability.

Since the inception of widespread industrial utilization of the catalytic reforming process, the principal and dominant dual-function hydrocarbon conversion catalyst has been one containing platinum as its principal hydrogenation-dehydrogenation component. Despite all attempts that have been made to find a replacement for platinum in this type of catalyst, no substantial success has ever been reported. While it is true that the technical literature has recently been replete with announcements of new and improved dual-function hydrocarbon conversion catalyst suitable for use in the catalytic reforming process, these have to the best of applicant's knowledge, all involved catalysts that still contain platinum. Because platinum has become the indispensable ingredient for a successful catalyst for use in the catalytic reforming process, its use for this purpose has been rapidly expanding in direct proportion to the increased activity that has taken place in the petroleum industry on a world wide basis. Responsive to this expanding use in the conversion of hydrocarbons and like expansions in other industrial uses for platinum, the market price for platinum has reached rather high levels. This high price level for platinum has in turn intensified efforts towards finding an acceptable substitute for it in hydrocarbon conversion service, particularly in catalytic reforming service.

A likely candidate for an acceptable platinum substitute that has long been studied is palladium. It is in relatively plentiful supply relative to platinum, and reflecting this supply situation, its price is about one-fifth or less than that of platinum. Notwithstanding the tremendous financial incentive provided by this price differential, no palladium-containing catalyst has, to the best of applicant's knowledge, ever been disclosed that even begins to match the performance characteristics in hydrocarbon conversion services of a comparable platinum-containing catalyst. For example, a catalyst containing platinum and halogen on alumina has long dominated the catalytic reforming art; and in spite of vigorous efforts to improve it, a comparable catalyst having palladium as its sole metallic component has always been found to have substantially less than one-half the activity of the platinum-containing catalyst coupled with markedly inferior stability and selectivity characteristics.

Hence the problem addressed by the present invention is to find a dual-function catalytic composite that is free of platinum and yet has performance characteristics which are comparable to a platinum-containing catalyst when used to accelerate hydrocarbon conversion reactions. More specifically, the problem is to develop a dual-function hydrocarbon conversion catalyst which is free of platinum and which in a catalytic reforming process yields results which are equivalent to those observed with a platinum-containing catalyst.

I have now found a platinum-free, dual-function catalytic composite which possesses satisfactory activity, stability and selectivity characteristics when employed in a process for the conversion of hydrocarbons of the type which have heretofore utilized platinum-containing dual-function catalysts. And in view of the dismal history of palladium-containing catalysts for this type of use, it is a surprising feature of my catalyst that it contains palladium. In particular, I have ascertained that a combination of catalytically effective amounts of a palladium component, an iridium component and a halogen component with a porous carrier material can provide a platinum-free catalytic composite that has hydrocarbon conversion characteristics which are comparable to those obtained with a platinum-containing catalyst. Moreover, I have discerned that in order for this type of composite to possess these beneficial characteristics, it is necessary that the amounts of palladium and iridium components be carefully selected so that the resulting composite has an atomic ratio of iridum to palladium which is selected from the narrow range of about 0.5:1 to about 1.5:1. It is evident from the previous discussion of the economics associated with the replacement of platinum in this type of catalyst that the principal advantage associated with the present invention is an economic one which is dependent on the price of platinum relative to the price of a comparable amount of palladium and iridium. When the price of platinum is higher, the present invention becomes very attractive. In short, the principal advantage of the present invention is that it provides a viable and realistic alternative to platinum for this kind of catalyst.

It is, accordingly, one object of the present invention to provide a platinum-free catalyst having dual-function hydrocarbon conversion performance characteristics which are comparable to those observed with a platinum-containing catalyst. A second object is to provide a viable and realistic alternative to platinum as the hydrogenation-dehydrogenation component of a dual-function hydrocarbon conversion catalyst. Another object is to provide an efficient and effective palladium-containing hydrocarbon conversion catalyst.

In brief summary, the present invention is, in one embodiment, a process for converting a hydrocarbon which comprises contacting the hydrocarbon, at hydrocarbon conversion conditions, with a platinum-free catalytic composite comprising a combination of catalytically effective amounts of a palladium component, an iridium component and a halogen component with a porous carrier material. The porous carrier material is typically a porous, refractory material such as a refractory inorganic oxide, and the palladium component, the iridium component and the halogen component are usually utilized in relatively small amounts which are effective to promote the desired hydrocarbon conversion reaction. Moreover, the amounts of palladium and iridium used therein are selected to result in an atomic ratio of iridium to palladium of about 0.5:1 to 1.5:1.

A second embodiment relates to a hydrocarbon conversion process as described in the first embodiment wherein the catalytic composite comprises a combination of catalytically effective amounts of a palladium component, an iridium component, and a halogen component with an alumina carrier material. These components are preferably present in the composite in amounts sufficient to result in a final composite having an atomic ratio of iridium to palladium of about 0.5:1 to about 1.5:1 and containing, on an elemental basis, about 0.1 to about 3.5 wt. percent halogen, about 0.01 to about 2 wt. percent palladium, and about 0.01 to about 2 wt. percent iridium.

Another embodiment relates to a hydrocarbon conversion process as described in the first embodiment wherein the composite comprises a combination of the catalytic composite described in this embodiment with a sulfur component in an amount sufficient to incorporate about 0.05 to about 0.5 wt. percent sulfur, calculated on an elemental basis.

A preferred embodiment relates to a process for reforming a gasoline fraction which comprises contacting the gasoline fraction and hydrogen with the catalytic composite described above in the first embodiment at reforming conditions selected to produce a high-octane reformate.

Other objects and embodiments of the present invention relate to additional details regarding preferred and essential catalytic ingredients, acceptable and preferred amounts of catalytic ingredients, suitable methods of composite preparation, operating conditions for use in the hydrocarbon conversion processes, and the like particulars. These are hereinafter given in the following detailed discussion of each of these facets of the present invention. It is to be noted that the term "catalytic composite" and "catalyst" are used herein in an interchangeable and equivalent manner.

The platinum-free catalyst of the present invention comprises a porous carrier material or support having combined therewith catalytically effective amounts of a palladium component, an iridium component and a halogen component. Considering first the porous carrier material utilized in the present invention, it is preferred that the material be a porous, adsorptive, high-surface area support having a surface area of about 25 to about 500 m²/g. The porous carrier material should be relatively refractory to the conditions utilized in the hydrocarbon conversion process, and it is intended to include within the scope of the present invention carrier materials which have traditionally been utilized in dual-function hydrocarbon conversion catalysts such as: (1) activated carbon, coke, or charcoal; (2) silica or silica gel, silicon carbide, clays, and silicates including those synthetically prepared and naturally occurring, which may or may not be acid treated, for example, attapulgus clay, china clay, diatomaceous earth, fuller's earth, kaolin, kieselguhr, etc.; (3) ceramic, porcelain, crushed firebrick, bauxite; (4) refractory inorganic oxides such as alumina, titanium dioxide, zirconium dioxide, chromium oxide, zinc oxide, magnesia, thoria, boria, silica-alumina, silica-magnesia, chromia-alumina, alumina-boria, silica-zirconia, etc.; (5) crystalline aluminosilicates such as naturally occurring or synthetically prepared mordenite and/or faujasite, either in the hydrogen form or in a form which has been treated with multivalent cations; and, (6) combinations of one or more elements from one or more of these groups. The preferred porous carrier materials for use in the present invention are refractory inorganic oxides, with best results obtained with an alumina carrier material. Suitable alumina materials are the crystalline aluminas known as the gamma-, eta-, and theta-aluminas, with gamma-alumina giving best results. In addition, in some embodiments, the alumina carrier material may contain minor proportions of other well known refractory inorganic oxides such as silica, zirconia, magnesia, etc.; however, the preferred support is substantially pure gamma-alumina. Preferred carrier materials have an apparent bulk density of about 0.3 to about 0.7 g/cc and surface area characteristics such that the average pore diameter is about 20 to 300 Angstroms, the pore volume is about 0.1 to about 1 ml/g and the surface area is about 100 to about 500 m²/g. In general, excellent results are typically obtained with a gamma-alumina carrier material which is used in the form of spherical particles having: a relatively small diameter (i.e., typically about one-sixteenth inch), an apparent bulk density of about 0.5 g/cc, a pore volume of about 0.4 ml/g, and a surface area of about 175 m²/g.

The preferred alumina carrier material may be prepared in any suitable manner and may be synthetically prepared or natural occurring. Whatever type of alumina is employed it may be activated prior to use by one or more treatments including drying, calcination, steaming, etc., and it may be in a form known as activated alumina of commerce, porous alumina, alumina gel, etc. For example, the alumina carrier may be prepared by adding a suitable alkaline reagent, such as ammonium hydroxide to a salt of aluminum such as aluminum chloride, aluminum nitrate, etc., in an amount to form an aluminum hydroxide gel which upon drying and calcining is converted to alumina. The alumina carrier may be formed in any desired shape such as spheres, pills, cakes, extrudates, powders, granules, etc., and utilized in any desired size. For the purpose of the present invention a particularly preferred form of alumina is the sphere; and alumina spheres may be continuously manufactured by the well-known oil drop method which comprises: forming an alumina hydrosol by any of the techniques taught in the art and preferably by reacting aluminum metal with hydrochloric acid; combining the resulting hydrosol with a suitable gelling agent; and dropping the resultant mixture into an oil bath maintained at elevated temperatures. The droplets of the mixture remain in the oil bath until they set and form hydrogel spheres. The spheres are then continuously withdrawn from the oil bath and typically subjected to specific aging and drying treatments in oil and an ammoniacal solution to further improve their physical characteristics. The resulting aged and gelled particles are then washed and dried at a relatively low temperature of about 300° F. to about 400° F. and subjected to a calcination procedure at a temperature of about 850° F. to about 1,300° F. for a period of about 1 to about 20 hours. This treatment effects conversion of the alumina hydrogel to the corresponding crystalline gamma-alumina. See teachings of U.S. Pat. No. 2,620,314 for additional details.

One essential ingredient of the subject catalyst is the palladium component. This component may exist within the final catalytic composite as a compound such as an oxide, sulfide, halide, etc., or as an elemental metal or in chemical combination with one or more of the other ingredients of the present composite. Generally, the amount of the palladium component present in the final catalyst composite is small compared to the quantities of the other components combined therewith. In act, this component generally comprises about 0.01 to about 2 t. percent of the inal catalytic composite, calculated on an elemental basis. Excellent results are obtained when the catalyst contains about 0.05 to about 1 wt. percent of palladium.

This palladium component may be incorporated in the catalytic composite in any suitable manner such as coprecipitation or cogellation, ion-exchange, or impregnation. The preferred method of preparing the catalyst involves the utilization of a soluble, decomposable compound of palladium to impregnate the carrier material. For example, this component may be added to the support by commingling the latter with an aqueous solution of chloropalladic acid. Other water-soluble compounds of palladium may be employed in impregnation solutions and include palladium chloride, palladium nitrate, palladium sulfate, palladium-potassium chloride, palladium-sodium chloride, dichlorodiaminopalladium, etc. The utilization of a palladium chloride compound such as chloropalladic acid, is preferred since it facilitates the incorporation of both the palladium component and at least a minor quantity of the halogen component in a single step. Hydrogen chloride or the like acid is also generally added to the impregnation solution in order to further facilitate the incorporation of the halogen component and the distribution of the metallic component. In addition, it is generally preferred to impregnate the carrier material after it has been calcined in order to minimize the risk of washing away the valuable palladium compounds; however, in some cases it may be advantageous to impregnate the carrier material when it is in a gelled state. It is generally a preferred practice to incorporate this component in a manner selected to result in a relatively uniform dispersion of it in the carrier material.

Another essential ingredient of the present catalytic composite is an iridium component. This component may be present in the composite as an elemental metal, or in chemical combinations with one or more of the other ingredients of the composite, or as a chemical compound of iridium such as the oxide, sulfide, halide, oxychloride, and the like. The iridium component may be utilized in the composite in any amount which is catalytically effective, with the preferred amount being about 0.01 to about 2 wt. percent thereof, calculated on an elemental iridium basis. Typically, best results are obtained with about 0.05 to about 1 wt. percent iridium. It is, additionally, essential to select the specific amount of iridium from within this broad weight range as a function of the amount of the palladium component, on an atomic basis as is explained hereinafter.

The iridium component may be incorporated into the catalytic composite in any suitable manner known to those skilled in the catalyst formulation art. In addition, it may be added at any stage of the preparation of the composite — either during preparation of the carrier material or thereafter — and the precise method of incorporation used is not deemed to be critical. However, best results are thought to be obtained when the iridium component is relatively uniformly distributed throughout the carrier material, and the preferred procedures are the ones known to result in a composite having this relatively uniform distribution. One preferred procedure for incorporating this ingredient into the composite involves cogelling or coprecipitating the iridium component during the preparation of the preferred carrier material, alumina. This procedure usually comprehends the addition of a soluble, decomposable compound of iridium such as iridium tetrachloride to the alumina hydrosol before it is gelled. The resulting mixture is then finished by conventional gelling, aging, drying and calcination steps as explained hereinbefore. Another preferred way of incorporating this component is an impregnation step wherein the porous carrier material is impregnated with a suitable iridium-containing solution either before, during or after the carrier material is calcined. Preferred impregnation solutions are aqueous solutions of water soluble, decomposable iridium compounds such as iridium tribromide, iridium dichloride, iridium tetrachloride, iridium oxalic acid, iridium sulfate, potassium iridochloride, chloroiridic acid and the like compounds. Best results are ordinarily obtained when the impregnation solution is an aqueous solution of chloroiridic acid or sodium chloroiridate. This component can be added to the carrier material, either prior to, simultaneously with, or after the palladium component is combined therewith. Best results are usually achieved when this component is added simultaneously with the palladium component. In fact, excellent results have been obtained, as reported in the examples, with a one step impregnation procedure using an aqueous solution comprising chloropalladic acid, chloroiridic acid and hydrochloric acid.

Yet another essential ingredient of the instant catalytic composite is a halogen component. Although the precise form of the chemistry of the association of the halogen component with the carrier material is not entirely known, it is customary in the art to refer to the halogen component as being combined with the carrier material, or with the other ingredients of the catalyst in the form of the halide (e.g., the chloride). This combined halogen may be either fluorine, chlorine, iodine, bromine, or mixtures thereof. Of these, fluorine and particularly chlorine are preferred for the purposes of the present invention. The halogen may be added to the carrier material in any suitable manner either during preparation of the support or before or after the addition of the other components. For example, the halogen may be added in an impregnation step, at any stage of the preparation of the carrier material or to the calcined carrier material as an aqueous solution of a suitable decomposable, halogen-containing compound such as hydrogen fluoride, hydrogen chloride, hydrogen bromide, ammonium chloride, etc. The halogen component or a portion thereof may be combined with the carrier material during the impregnation of the latter with the palladium component; for example, through the utilization of a mixture of chloropalladic acid and hydrogen chloride. In another situation, the alumina hydrosol which is commonly utilized to form the preferred alumina carrier material typically will contain halogen and thus contribute at least a portion of the halogen component to the final composite. For reforming, the halogen will be typically combined with the carrier material in an amount sufficient to result in a final composite that contains about 0.1 to about 3.5 wt. percent and preferably about 0.5 to about 1.5 wt. percent of halogen calculated on an elemental basis. In isomerization or hydrocracking embodiments, it is generally preferred to utilize relatively large amounts of halogen in the catalyst — typically ranging up to about 10 wt. percent halogen calculated on an elemental basis, and more preferably about 1 to about 5 wt. percent.

Regarding the preferred amounts of the various metallic components of the subject catalyst, I have found it to be essential that the amount of the iridium component is selected as a function of the amount of the palladium component. On this basis, the amount of the iridium component is ordinarily selected so that the atomic ratio of iridium to the palladium metal contained in the composite is about 0.5:1 to about 1.5:1, with best results obtained at a mole ratio of 1:1.

Another significant parameter for the present catalyst is the "total metals content" which is defined to be the sum of the palladium component and the iridium component, calculated on an elemental basis. Good results are ordinarily obtained with the subject catalyst when this parameter is fixed at a value of about 0.1 to about 2 wt. percent, with best results ordinarily achieved at a metals loading of about 0.2 to about 1.5 wt. percent.

In embodiments of the present invention wherein the instant catalytic composite is used for dehydrogenation of dehydrogenatable hydrocarbons or for the hydrogenation of hydrogenatable hydrocarbons, it is ordinarily a preferred practice to include an alkali or alkaline earth metal component in the composite. More precisely, this optional component is selected from the group consisting of the compounds of the alkali metals — cesium, rubidium, potassium, sodium, and lithium — and the compounds of the alkaline earth metals — calcium, strontium, barium and magnesium. Generally, good results are obtained in these embodiments when this component constitutes about 1 to about 5 wt. percent of the composite, calculated on an elemental basis.

Integrating the above discussion of each of the essential and preferred ingredients of the catalytic composite, it is evident that a particularly preferred catalytic composite, for catalytic reforming comprises a combination of a palladium component, an iridium component, and a halogen component with an alumina carrier material in amounts sufficient to result in the composite containing about 0.5 to about 1.5 wt. percent halogen, about 0.05 to about 1 wt. percent palladium and about 0.05 to about 1 wt. percent iridium. Moreover, the atomic ratio of iridium to palladium must be selected from the range of about 0.5:1 to about 1.5:1.

Regardless of the details of how the components of the catalyst are combined with the porous carrier material, the final catalyst generally will be dried at a temperature of about 200° F. to about 600° F. for a period of from about 2 to about 24 hours or more, and finally calcined or oxidized at a temperature of about 700° F. to about 1,100° F. in an air atmosphere for a period of about 0.5 to about 10 hours in order to convert the metallic components substantially to the oxide form. In the case where a halogen component is utilized in the catalyst, best results are generally obtained when the halogen content of the catalyst is adjusted during the calcination step by including water and a halogen or a halogen-containing compound in the air atmosphere utilized. In particular, when the halogen component of the catalyst is chlorine, it is preferred to use a mole ratio of $H_2O$ to $HCl$ of about 20:1 to about 100:1 during composite least a portion of the calcination step in order to adjust the final chlorine content of the catalyst to a range of about 0.5 to about 1.5 wt. percent. reducing agent is to substantially reduce at least the palladium component to the elemental state.

Although it is not essential, it is preferred that the resultant calcined catalytic compoiste be subjected to a substantially water-free reduction step prior to its use in the conversion of hydrocarbons. This step is designed to insure a uniform and finely divided dispersion of the metallic components throughout the carrier material. Preferably, substantially pure and dry hydrogen (i.e., containing less than 20 vol. ppm. $H_2O$) is used as the reducing agent in this step. The reducing gent is contacted with the calcined catalyst at a temperature of about 800° F. to about 1,200° F. and for a period of time of about 0.5 to 10 hours or more effective to the elemental state. This reduction treatment may be performed in situ as part of a start-up sequence if precautions are taken to predry the plant to a substantially water-free state and if substantially water-free hydrogen is used.

The resulting reduced catalytic composite may, in some cases, be beneficially subjected to a presulfiding operation designed to incorporate in the catalytic composite from about 0.05 to about 0.5 wt. percent sulfur calculated on an elemental basis. Preferably, this presulfiding treatment takes place in the presence of hydrogen and a suitable sulfur-containing compound such as hydrogen sulfide, lower molecular weight mercaptans, organic sulfides, etc. Typically, this procedure comprises treating the reduced catalyst with a sulfiding gas such as a mixture of hydrogen and hydrogen sulfide containing about 10 moles of hydrogen per mole of hydrogen sulfide at conditions sufficient to effect the desired incorporation of sulfur, generally including a temperature ranging from about 50° F. up to about 1,100° F. or more. It is generally a good practice to perform this optional presulfiding step under substantially water-free conditions.

According to the present invention, a hydrocarbon charge stock and hydrogen are contacted with a catalyst of the type described above in a hydrocarbon conversion zone. This contacting may be accomplished by using the catalyst in a fixed bed system, a moving bed system, a fluidized bed system, or in a batch type operation; however, in view of the danger of attrition losses of the valuable catalyst and of well known operation advantages, it is preferred to use a fixed bed system. In this system, a hydrogen rich gas and the charge stock are preheated by any suitable heating means to the desired reaction temperature and then are passed, into a conversion zone containing a fixed bed of the catalyst type previously characterized. It is of course, understood that the conversion zone may be one or more separate reactors with suitable means therebetween to insure that the desired conversion temperature is maintained at the entrance to each reactor. It is also important to note that the reactants may be contacted with the catalyst bed in either upward, downward, or radial flow fashion, with the latter being preferred. In addition, the reactants may be in the liquid phase, a mixed liquid-vapor phase or a vapor phase when they contact the catalyst, with best results obtained in the vapor phase.

In the case where the catalyst of the present invention is used in a reforming operation, the reforming system will comprise a reforming zone containing a fixed bed of the catalyst type previously characterized. This reforming zone may be one or more separate reactors with suitable heating means therebetween to compensate for the endothermic nature of the reactions that take place in each catalyst bed. The hydrocarbon feed stream that is charged to this reforming system will comprise hydrocarbon fractions containing naphthenes and paraffins that boil within the gasoline range. The preferred charge stocks are those consisting essentially of naphthenes and paraffins, although in many cases aromatics will also be present. This preferred class includes straight run gasolines, natural gasolines, synthetic gasolines, and the like. On the other hand, it is frequently advantageous to charge thermally or catalytically cracked gasolines or higher boiling fractions thereof. Mixtures of straight run and cracked gasolines can also be used to advantage. The gasoline charge stock may be a full boiling range gasoline having an initial boiling point of from about 50° F. to about 150° F. and an end boiling point within the range of from about 325° F. to about 425° F., or may be a selected fraction thereof which generally will be a higher boiling fraction commonly referred to as a heavy naphtha — for example, a naphtha boiling in the range of $C_7$ to 400° F. In some cases, it is also advantageous to charge pure hydrocarbons or mixtures of hydrocarbons that have been extracted from hydrocarbon distillates — for example, straight-chain paraffins — which are to be converted to aromatics. It is preferred that these charge stocks be treated by conventional catalytic pretreatment methods such as hydrorefining, hydrotreating, hydrodesulfurization, etc., to remove substantially all sulfurous, nitrogenous and water-yielding contaminants therefrom, and to saturate any olefins that may be contained therein.

In other hydrocarbon conversion embodiments, the charge stock will be of the conventional type customarily used for the particular kind of hydrocarbon conversion being effected. For example, in a typical isomerization embodiment the charge stock can be a paraffinic stock rich in $C_4$ to $C_8$ normal paraffins, or a normal butane-rich stock or a n-hexane-rich stock or a mixture of xylene isomers, etc. In hydrocracking embodiments the charge stock will be typically a gas oil, heavy cracked cycle oil, etc. In addition, alkylaromatics and naphthenes can be conveniently isomerized by using the catalyst of the present invention. Likewise, pure hydrocarbons or substantially pure hydrocarbons can be converted to more valuable products by using the catalyst of the present invention in any of the hydrocarbon conversion processes known to the art that use a dual-function catalyst.

In a reforming embodiment, it is generally a preferred practice to use the present catalytic composite in a substantially water-free environment. Essential to the achievement of this condition in the reforming zone is the control of the amount of water and water-producing compounds present in the charge stock and the hydrogen stream which are being charged to the conversion zone. Best results are ordinarily obtained when the total amounts of water or water-producing compounds entering the conversion zone from any source is held to a level less than 50 ppm., expressed as weight of equivalent water in the charge stock. In general, this can be accomplished by a suitable pretreatment of the charge stock with hydrogen coupled with careful control of the water present in the charge stock and in the hydrogen stream; the charge stock can be dried by using any suitable drying means known to the art such as a conventional solid adsorbent having a high selectivity for water; for instance, sodium or calcium crystalline aluminosilicates, silica gel, activated alumina, molecular sieves, anhydrous calcium sulfate, high surface area sodium and the like adsorbents. Similarly, the water content of the charge stock may be adjusted by suitable stripping operations in a fractionation column or like device. And in some cases, a combination of adsorbent drying and distillation drying may be used advantageously to effect almost complete removal of water from the charge stock.

In the reforming embodiment, an effluent stream is withdrawn from the reforming zone and passed through a cooling means to a separation zone, typically maintained at about 25° to 150° F., wherein a hydrogen-rich gas is separated from a high octane liquid product, commonly called an unstabilized reformate. Preferably, at least a portion of this hydrogen-rich gas is withdrawn from the separating zone and recycled through suitable compressing means back to the reforming zone. The liquid phase from the separating zone is then typically withdrawn and commonly treated in a fractionating system in order to adjust the butane concentration, thereby controlling front end volatility of the resulting reformate.

The conditions utilized in the numerous hydrocarbon conversion embodiments of the present invention are those customarily used in the art for the particular reaction or combination of reactions that is to be effected. For instance, alkylaromatic, naphthene, olefin and paraffin isomerization conditions include: a temperature of about 32° F. to about 1,000° F. and preferably about 75° to about 600° F.; a pressure of atmospheric to about 100 atmospheres; a hydrogen to hydrocarbon mole ratio of about 0.5:1 to about 20:1, and a LHSV (calculated on the basis of equivalent liquid volume of the charge stock contacted with the catalyst per hour divided by the volume of conversion zone containing catalyst) of about 0.2 hr.$^{-1}$ to 10 hr.$^{-1}$. Dehydrogenation conditions include: a temperature of about 700° to about 1,250° F., a pressure of about 0.1 to about 10 atmospheres, a liquid hourly space velocity of about 1 to 40 hr.$^{-1}$ and a hydrogen to hydrocarbon mole ratio of about 1:1 to 20:1. Likewise, typically hydrocracking conditions include: a pressure of about 500 psig. to about 3,000 psig.; a temperature of about 400° F. to about 900° F.; an LHSV of about 0.1 hr.$^{-1}$ to about 10 hr.$^{-1}$, and hydrogen circulation rates of about 1,000 to 10,000 SCF per barrel of charge.

In the reforming embodiment of the present invention the pressure utilized is selected from the range of about 0 psig. to about 1,000 psig., with the preferred pressure being about 50 psig. to about 500 psig. The inlet temperature to the conversion zone is selected from the range of about 800° F. to about 1,100° F. and preferably about 900° F. to about 1,050° F. In addition, sufficient hydrogen is charged to the conversion zone to provide an amount of about 1 to about 20 moles of hydrogen per mole of hydrocarbon entering the reforming zone, with excellent results being obtained when about 5 to about 10 moles of hydrogen are used per mole of hydrocarbon. Likewise, the liquid hourly space velocity (LHSV) used in reforming is selected from the range of about 0.1 to about 10 hr.$^{-1}$, with a value in the range of about 1 to about 5 hr.$^{-1}$ being preferred.

The following examples are presented in order to illustrate further the preparation of the catalytic composite of the present invention and the use thereof in the conversion of hydrocarbons. It is understood that the examples are intended to be illustrative rather than restrictive.

EXAMPLE I

This example demonstrates a particularly good method of preparing the preferred catalytic composite of the present invention.

An alumina carrier material comprising 1/16 inch spheres was prepared by: forming an aluminum hydroxyl chloride sol by dissolving substantially pure aluminum pellets in a hydrochloric acid solution, adding hexamethylenetetramine to the resulting sol, gelling the resulting solution by dropping it into an oil bath to form spherical particles of an aluminum hydrogel, aging and washing the resulting particles and finally drying and calcining the aged and washed particles to form spherical particles of gamma-alumina containing about 0.3 wt. percent combined chloride. Additional details as to this method of preparing the preferred carrier material are given in the teachings of U.S. Pat. No. 2,260,314.

An aqueous solution containing chloroiridic acid, chloropalladic acid and hydrogen chloride was then prepared. The solution was then used to impregnate the gamma-alumina particles in amounts, respectively, calculated to result in a final composite containing 0.375 wt. percent palladium and 0.375 wt. percent iridium. The hydrogen chloride was used in an amount of about 2 wt. percent of the alumina particles that were impregnated. In order to insure uniform distribution of the metallic components throughout the carrier material, this impregnation step is performed by adding the carrier material particles to the impregnation mixture with constant agitation. The impregnation mixture is maintained in contact with the carrier material particles for a period of about one-half hour at a temperature of about 70° F. Thereafter, the temperature of the impregnation mixture is raised to about 225° F. and the excess solution is evaporated in a period of about 1 hour. The resulting dried particles are then subjected to a calcination treatment in an air atmosphere at a temperature of about 977° F. for about 15 minutes. The calcined spheres are then contacted with an air stream containing $H_2O$ and HCl in a mole ratio of about 40:1 for about 2 hours at 975° F. in order to adjust the halogen content of the catalyst particles to a value of about 0.90.

The resulting catalyst particles are analyzed and found to contain, on an elemental basis, about 0.375 wt. percent palladium, about 0.375 wt. percent iridium and about 0.92 wt. percent chloride. For this catalyst, the atomic ratio of iridium to palladium is about 1:1.

EXAMPLE II

In order to compare the novel catalyst composite of the present invention with an all platinum composite of the prior art, a comparison test was made between the catalyst of the present invention, which was prepared according to the method given in Example I, and a high quality, all platinum catalyst of the prior art which comprised of 0.75 wt. percent platinum and 0.9 wt. percent chloride combined with a gamma-alumina carrier material.

These catalysts were then separately subjected to a high stress evaluation test designed to determine their relative activity and selectiviey for the reforming of a gasoline charge stock. In both tests the same charge stock was utilized, its characteristics are given in Table I. It is to be noted that this test is conducted under a substantially water-free condition with the only significant source of water being the 5.9 wt. ppm. present in the charge stock.

TABLE I

ANALYSIS OF HEAVY KUWAIT NAPHTHA

| | |
|---|---|
| API gravity at 60° F. | 60.4 |
| Initial boiling point, ° F. | 184 |
| 10% boiling point, ° F. | 205 |
| 50% boiling point, ° F. | 256 |
| 90% boiling point, ° F. | 321 |
| End boiling point, ° F. | 360 |
| Sulfur, wt. ppm. | 0.5 |
| Nitrogen, wt. ppm. | 0.1 |
| Aromatics, vol. % | 8 |
| Paraffins, vol. % | 71 |
| Naphthenes, vol. % | 21 |
| Water, ppm. | 5.9 |
| Octane no., F-1 clear | 40.0 |

This test was specifically designed to determine in a very short time period whether the catalyst being evaluated has superior characteristics for the reforming process. It consisted of 8 periods, the first period being a line-out period of 6 hours, followed by three 10-hour test periods run at a temperature of about 970° F., another 6-hour line-out period and three 10-hour test periods run at about 1,000° F. During each test period, a $C_5+$ product reformate was collected. The test was performed in a laboratory scale reforming plant comprising a reactor containing the catalyst, hydrogen separation zone, a debutanizer column, suitable heating, pumping, and condensing means, etc.

In this plant, a hydrogen recycle stream and the charge stock are commingled and heated to the desired conversion temperature. The resulting mixture is then passed downflow into a reactor containing the catalyst as a fixed bed. An effluent stream is then withdrawn from the bottom of the reactor, cooled to about 55° F. and passed to the separating zone wherein a hydrogen-rich gaseous phase separates from a liquid phase. A portion of the gaseous phase is continuously passed through a high surface area sodium scrubber and the resulting substantially water-free hydrogen stream recycled to the reactor in order to supply hydrogen for the reaction, and the excess over that needed for plant pressure is recovered as excess separator gas. Moreover, the liquid phase from the separating zone is withdrawn therefrom and passed to the debutanizer column wherein light ends are taken overhead as debutanizer gas and a $C_5+$ reformate stream recovered as bottoms.

Conditions utilized in this test are: a constant temperature of about 970° F. for the first three test periods followed by a constant temperature of about 1,000° F. for the last three test periods, a liquid hourly space velocity of 3.0 hr.$^{-1}$, an outlet pressure of the reactor of 100 psig., and a mole ratio of hydrogen to hydrocarbon entering the reactor of 8:1. This two temperature test is designed to quickly and efficiently yield two points on the yield-octane curve for the particular catalysts. The conditions utilized are selected on the basis of experience to yield the maximum amount of information on the capability of the catalyst being tested to respond to a high severity operation.

The results of the separate tests performed on the catalyst of the present invention and the control catalyst are presented for each test period in Table II in reactor of inlet temperature to the SCF/bbl in ° F., net excess separator gas in standard cubic feet per barrel of charge (SCF/bb1), debutanizer overhead gas in SCF/bbl, the ratio of the debutanizer gas make to the total gas make and F-1 clear octane number.

TABLE II

RESULTS OF ACCELERATED REFORMING TEST

| Period No. | T, °F. | Separator Gas SCF/bbl | Debutanizer Gas SCF/bbl | Debut. Gas/Total Gas Ratio | Octane No. F-1 Clear |
|---|---|---|---|---|---|
| Catalyst of the present invention — 0.375 wt. % palladium, 0.375 wt. % iridium and 0.92 wt. % chlorine. | | | | | |
| 1 | 970 | 1406 | 90 | .06 | 95.3 |
| 2 | 970 | 1318 | 92 | .065 | 93.5 |
| 3 | 970 | 1178 | 94 | .074 | 89.9 |
| 4 | 1000 | 1305 | 123 | .086 | 93.7 |
| 5 | 1000 | 1273 | 122 | .087 | 93.4 |
| 6 | 1000 | 1250 | 123 | .090 | 93.4 |

TABLE II — Continued

RESULTS OF ACCELERATED REFORMING TEST

| Period No. | T, °F. | Separator Gas SCF/bbl | Debutanizer Gas SCF/bbl | Debut. Gas/Total Gas Ratio | Octane No. F-1 Clear |
|---|---|---|---|---|---|
| Control catalyst — 0.75 wt. % platinum and 0.90 wt. % chlorine. | | | | | |
| 1 | 970 | 1342 | 90 | .063 | 95.6 |
| 2 | 970 | 1254 | 73 | .055 | 92.5 |
| 3 | 970 | 1229 | 69 | .053 | 90.8 |
| 4 | 1000 | 1398 | 77 | .052 | 95.9 |
| 5 | 1000 | 1378 | 78 | .054 | 95.5 |
| 6 | 1000 | 1390 | 81 | .055 | 94.9 |

Referring now to the data presented in Table II, it is evident that the catalyst of the present invention performs in this test in a manner which is quite close to the all platinum control catalyst. Judging activity of the respective catalysts from the octane numbers of $C_5+$ product, it can be determined that the activity of the catalyst of the present invention is almost the same as the control catalyst. Similarly, by looking at the numbers for the ratio of debutanizer gas to total gas, it is manifest that the catalyst of the present invention has selectivity characteristics for reforming which are directly comparable to the control catalyst. Hence, it is clear that the catalyst of the present invention provides a platinum-free route to a high performance dual-function hydrocarbon conversion catalyst. The availability of this alternative route will, undoubtedly, represent a significant and singular contribution to the hydrocarbon conversion art if the present upward trend in the price of platinum continues.

It is intended to cover by the following claims all changes and modifications of the above disclosure of the present invention which would be self-evident to a man of ordinary skill in the catalyst formulation art or the hydrocarbon conversion art.

I claim as my invention:

1. A process for the reforming of a gasoline fraction which comprises contacting said fraction and hydrogen with a platinum-free catalytic composite comprising a combination of catalytically effective amounts of a palladium component, an iridium component and a halogen component with a porous carrier material, said composite containing, on an elemental basis, about 0.01 to about 2 wt. percent palladium, about 0.01 to about 2 wt. percent iridium and about 0.1 to about 3.5 wt. percent halogen, said palladium and iridium components being present in an atomic ratio of iridium to palladium in the range of about 0.5:1 to about 1.5:1, said contacting being at a temperature of about 800 to about 1,100° F., a pressure of about 0 to about 1,000 psig, a liquid hourly space velocity of about 0.1 to about 10 hrs.$^{-1}$, and a mole ratio of hydrogen to hydrocarbon of about 1:1 to about 20:1.

2. A process as defined as in claim 1 wherein the porous carrier material is a refractory inorganic oxide.

3. A process as defined in claim 2 wherein the refractory inorganic oxide is alumina.

4. A process as defined in claim 3 wherein said alumina is gamma-alumina.

5. A process as defined in claim 1 wherein the halogen component of the catalytic composite is chlorine or a compound of chlorine.

6. A process as defined in claim 4 wherein said composite contains, on an elemental basis, about 0.05 to about 1 wt. percent palladium, about 0.05 to about 1 wt. percent iridium and about 0.5 to about 1.5 wt. percent halogen.

7. A process as defined in claim 1 wherein the catalytic composite utilized contains a sulfur component in an amount corresponding to about 0.05 to about 0.5 wt. percent thereof, calculated on an elemental sulfur basis.

* * * * *